United States Patent [19]

Eastham et al.

[11] 3,958,138

[45] May 18, 1976

[54] LINEAR INDUCTION MOTORS

[75] Inventors: John Frederick Eastham; Eric Roberts Laithwaite, both of Long Ditton; Thomas George Fellows, Barnet; David John English Bromilow, Bottisham, all of England

[73] Assignee: Tracked Hovercraft Limited, London, England

[22] Filed: Oct. 24, 1974

[21] Appl. No.: 517,641

Related U.S. Application Data

[63] Continuation of Ser. No. 287,284, Sept. 8, 1972, abandoned.

[30] Foreign Application Priority Data

Sept. 10, 1971 United Kingdom............ 42378/71

[52] U.S. Cl. .................................................. 310/13
[51] Int. Cl.² ........................................ H02K 41/02
[58] Field of Search ............................. 310/12–14, 310/135; 104/148 LM

[56] References Cited

UNITED STATES PATENTS

| 1,754,685 | 4/1930 | Kauter | 310/13 |
| 3,644,762 | 2/1972 | Eastham | 310/13 |

FOREIGN PATENTS OR APPLICATIONS

| 230,823 | 2/1960 | Australia | 310/13 |

*Primary Examiner*—Donovan F. Duggan
*Attorney, Agent, or Firm*—Cameron, Kerkam, Sutton, Stowell & Stowell

[57] ABSTRACT

A linear induction motor primary has the winding conductors on at least part of its working face arranged in two nonparallel groups of mutually parallel conductors. All the windings on the working face, including end windings and cross over windings, are closely coupled to the magnetic material of the core of the primary.

15 Claims, 21 Drawing Figures

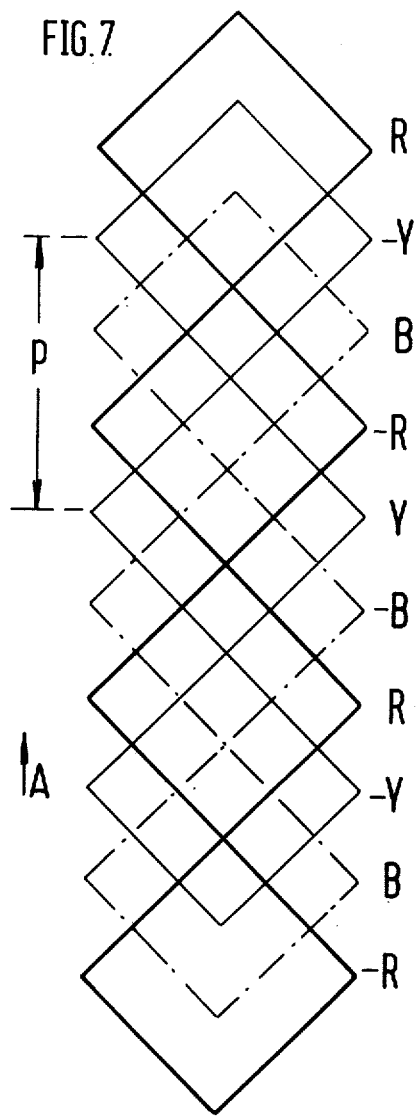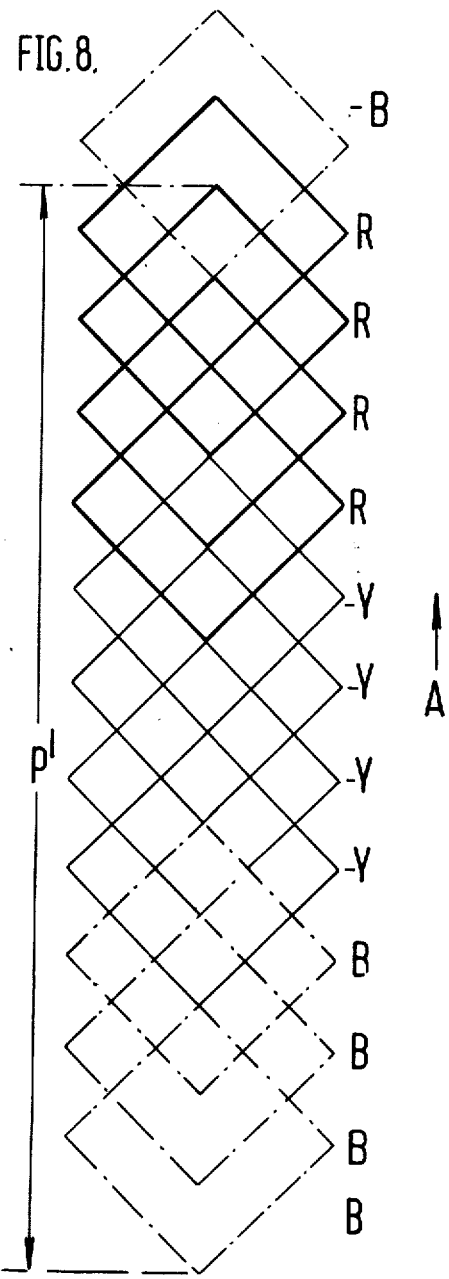

LINEAR INDUCTION MOTORS

This is a continuation of application Ser. No. 287,284, filed Sept. 8, 1972, now abandoned.

This invention relates to primary members of polyphase linear induction motors.

A polyphase linear induction motor comprises a primary member and a secondary member arranged confronting one another for relative longitudinal movement. The primary member carries a polyphase energising winding and the primary and secondary members are arranged and relatively disposed so as to provide low reluctance paths which magnetically link the primary and secondary members and which pass through electrically conductive material forming at least part of the secondary member. Flux driven around these magnetic paths by the energising winding during operation induces in the electrically conductive material currents which react with the flux to create a propulsive force between the primary and secondary members in a direction parallel to the longitudinal axis of the motor. Such flux is hereinafter referred to as 'working flux.'

When a linear induction motor primary contains large spaces between the places at which the m.m.f. is fixed, i.e., between the winding conductors, then if this primary faces a uniformly conducting secondary, the currents induced in the vicinity of the conductors are, as desired, substantially in anti-phase to the currents which they face, but opposite the above mentioned large spaces, the secondary current phase can change in an alarming manner giving rise to thrust losses.

According to the invention, in one aspect, a primary for a linear induction motor comprising a core of elongate magnetic material and winding conductors traversing the working face of said core and having a component parallel to the longitudinal axis of the motor, said winding conductors being so arranged that, in use, they intersect lines of constant flux phase on the working face of said core.

A motor in accordance with this aspect of the invention possesses the advantage that the m.m.f. is fixed at frequent intervals both in the longitudinal direction and in the transverse direction.

According to the invention in a second aspect, a primary for a linear induction motor comprising a core of magnetic material and winding conductors traversing the working face thereof, the winding conductors on at least part of the working face being arranged in two superimposed groups inclined in opposite direction to the longitudinal axis of the motor, said two groups of winding conductors being disposed in close proximity to the magnetic core so as to be magnetically coupled thereto.

In any of the above mentioned embodiments, the windings may be disposed on the surface of a flat toothless core instead of in slots between teeth. In this case, the windings are effectively located in the air gap between the primary iron and the secondary of the motor.

According to the invention in a third aspect, a primary for a linear induction motor having a core of magnetic material, at least part of the working face of said core being divided in an array of teeth by first and second groups of mutually parallel slots, the slots of the first group being parallel and the slots of the other group perpendicular to the longitudinal axis of the motor, winding conductors being disposed in said slots to groups selected adjacent teeth together to form cores for phase groups.

Embodiments of the invention will now be described, by way of example, with reference to the accompanying drawings, in which:

FIG. 5 is a perspective view of a coil suitable for forming the windings of the primary shown in FIG. 4;

FIGS. 7 and 8 are schematic diagrams of windings of the general type shown in FIGS. 1 to 5 illustrating how the pole pitch in the longitudinal direction may be increased by shortchording;

Throughout the drawings, the direction of movement of the secondary relative to the primary of various motors is indicated by an arrow A.

Figure 1:
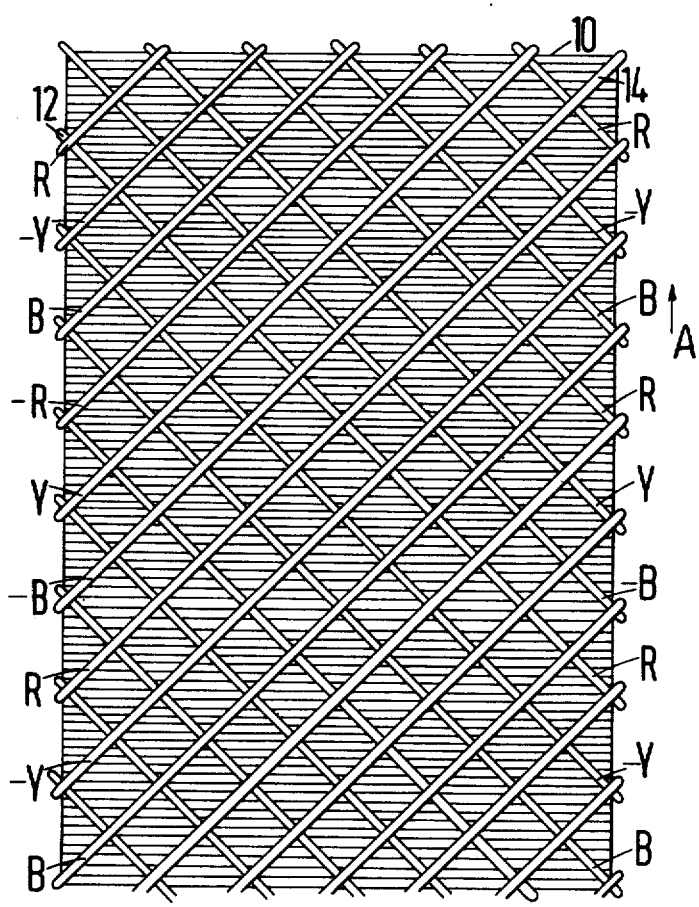
FIG. 1 is a plan view of the working face of the primary of a transverse flux three-phase linear induction motor in accordance with an embodiment of the invention having a gramme-ring windings.

FIG. 1 is a plan view of the working face of the primary of a three-phase linear induction motor. The primary core block 10 is a continuous block with transverse laminations. The windings are gramme-ring windings, the return conductors being disposed on the opposite side of the primary block 10 parallel to the conductors on the working face. The windings are arranged in two layers, the windings of the inner layer, such as the winding 12, being inclined at 45° to the direction of travel in one direction, and the windings of the outer layer, such as the winding 14, being inclined to the direction of travel at 45° in the opposite direction. Windings which are constructed to produce the effect of two superimposed sets of winding conductors located on the working face and inclined at opposite (usually equal) angles to the direction of travel are hereinafter referred to as "waffle windings" and this winding configuration is hereinafter referred to as "waffle configuration". Motors where the windings of waffle configuration extend to the lateral edges of the primary core have the advantage that the transverse m.m.f. is substantially zero at such lateral edges.

In the case of the primary shown in FIG. 1, each winding completes two complete pole pitches in the width of the motor and thus the motor is basically a C core transverse flux machine. The various windings are connected to their respective phases as shown.

Each set of windings acting alone would produce a field pattern travelling in a direction parallel to that of the windings of the other set. The reverse skew on the other set of windings neutralises the transverse component in the travelling field so that the combined effect of both sets of windings is to induce in the secondary a diamond-shaped pattern of currents progressing only in the drive direction. All lateral current patterns constitute standing waves.

An E core machine could also be produced by making the motor two pole pitches wide with one central pole and, effectively, half a pole at each side. More generally, the primary can be any even integral number of pole pitches wide provided that the overall width of the motor does not become unacceptable. If the motor is not an even integral number of pole pitches wide, this will cause production of undesirable longitudinal flux in the primary. With the motor shown in FIG. 1, since the winding conductors are disposed on the surface of the working face of the primary, the width of the air gap between the primary and the secondary must be greater than the overall thickness of the winding conductors at the points where the two layers cross. The width of the air gap can be reduced if slots are cut in the working face of the primary core block to accommodate the conductors.

Figure 2:
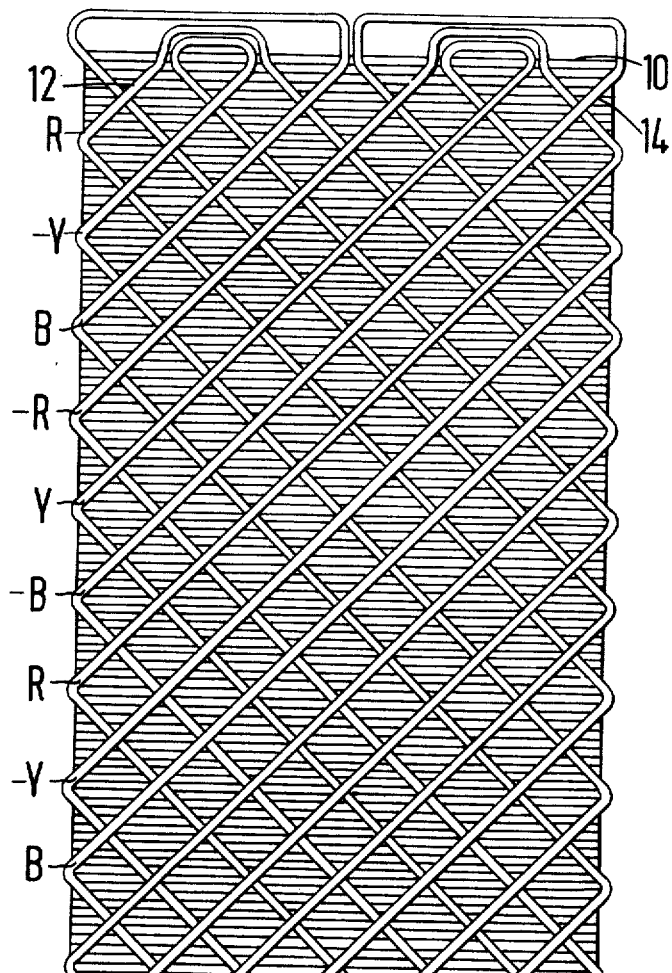
FIG. 2 is a plan view of the working face of the primary of a motor similar to that shown in FIG. 1 but having surface windings.
Figure 3:
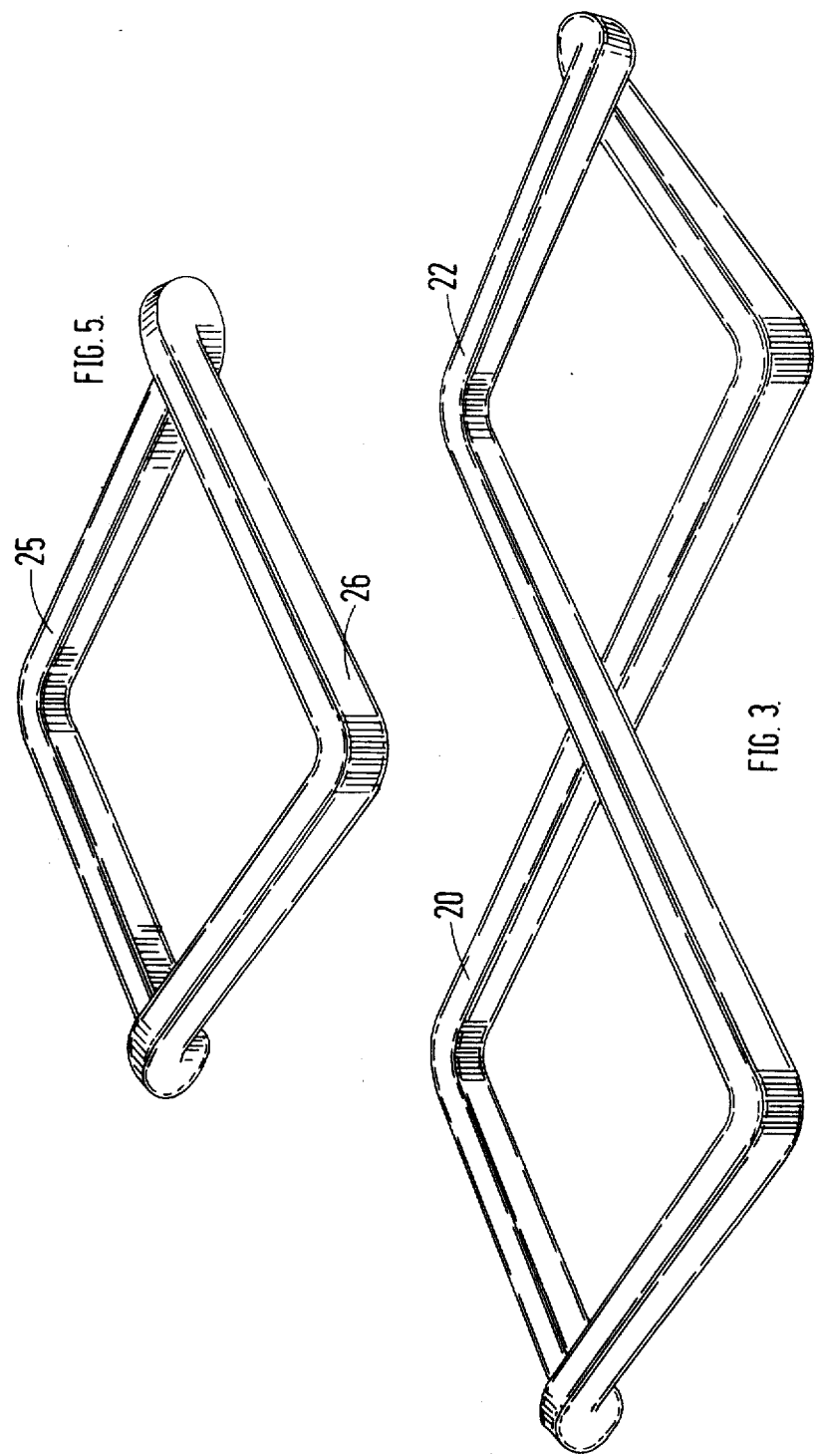
FIG. 3 is a perspective view of a coil suitable for forming the windings of the primary shown in FIG. 2.

It will be apparent from an inspection of FIG. 1 that by interconnecting the ends of the winding conductors of the two sets, the return conductors over the back of the core can be eliminated. This considerably reduces the amount of leakage reactance. A surface wound motor constructed on primary core 10 is shown in FIG. 2. Once again, a slotted version can be produced in order to reduce the air gap between the primary and secondary. It will be seen from FIG. 2 that, since each phase winding now consists of alternate top and bottom layer conductors, it would not be practicable to wind each phase as a continuous circuit. A preferred method of construction is to preform a series of coils as shown in FIG. 3 in two sections and to interconnect the ends of the coil sections after they have been fitted to the core. The section 20 replaces inner layer conductors and the section 22 replaces outer layer conductors.

Figure 4:
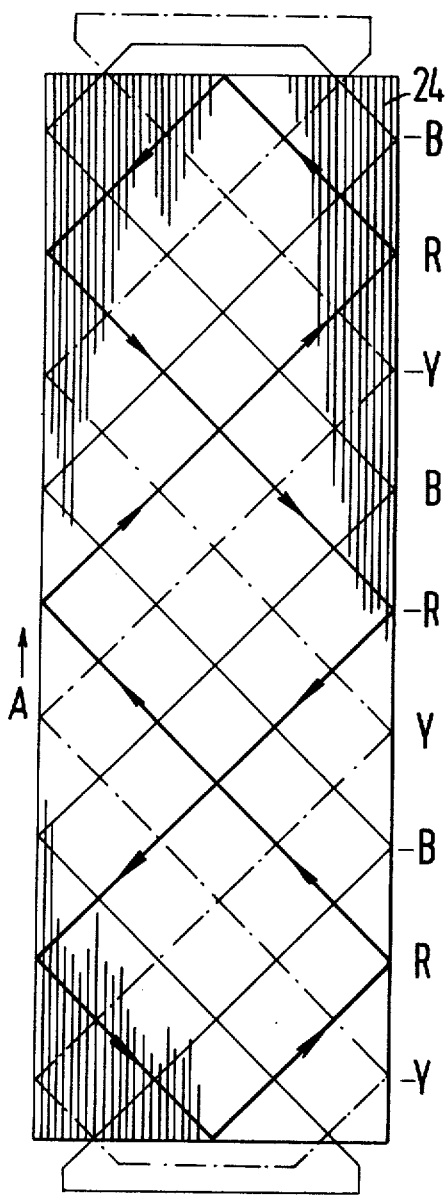
FIG. 4 is a plan view of the working face of a longitudinal flux linear induction motor in accordance with the invention having surface windings.

The criterion that tranverse flux waffle motors must be at least two transverse pole pitches wide does not apply to longitudinal flux motors. FIG. 4 is a plan view of the working face of the primary of a longitudinal flux motor having waffle windings. The core 24 is shown schematically but it should be understood that it in fact consists of longitudinal laminations, as can be seen from a consideration of the red phase windings, for example the motor is one pole pitch wide.

FIG. 5 illustrates a coil similar to the coil shown in FIG. 3 but suitable for use in forming the winding illustrated in FIG. 4. The section 25 replaces inner layer conductors and the section 26 replaces outer layer conductors.

Figure 6:
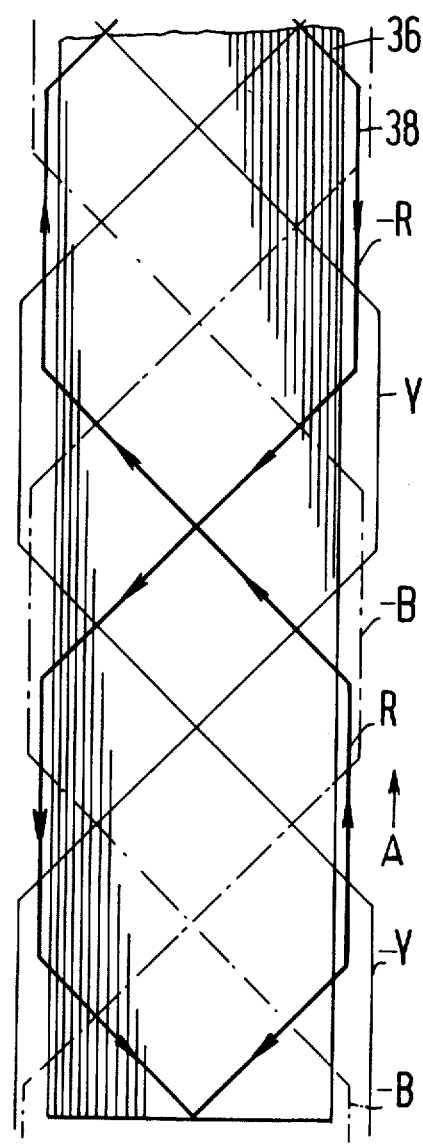
FIG. 6 is a plan view of the working face of the primary similar to that shown in FIG. 4 illustrating how the width of the motor may be reduced without reducing the coil pitch.

FIG. 6 shows part of the primary of a longitudinal flux motor having waffle windings of width less than one pole pitch. Once again, the primary core 36 is shown schematically and the red phase conductors 38 are represented by heavy lines. In order to achieve the width of less than one pole pitch, the windings are generally lozenge-shaped.

FIGS. 7 and 8 illustrate how the requirement that a primary having true waffle configuration should be an integral number of transverse pole pitches wide may be overcome by short chording. As is usual with short chording, this involves disadvantages such as additional resistive loss in the primary. FIG. 7 shows schematically the winding pattern of a waffle configuration primary which is not short chorded. The pole pitch in the direction of travel is indicated by $p$. FIG. 8 shows schematically a short chorded version of the of the winding shown in FIG. 7. The pole pitch in the direction of travel is not $p'$.

Figure 9:
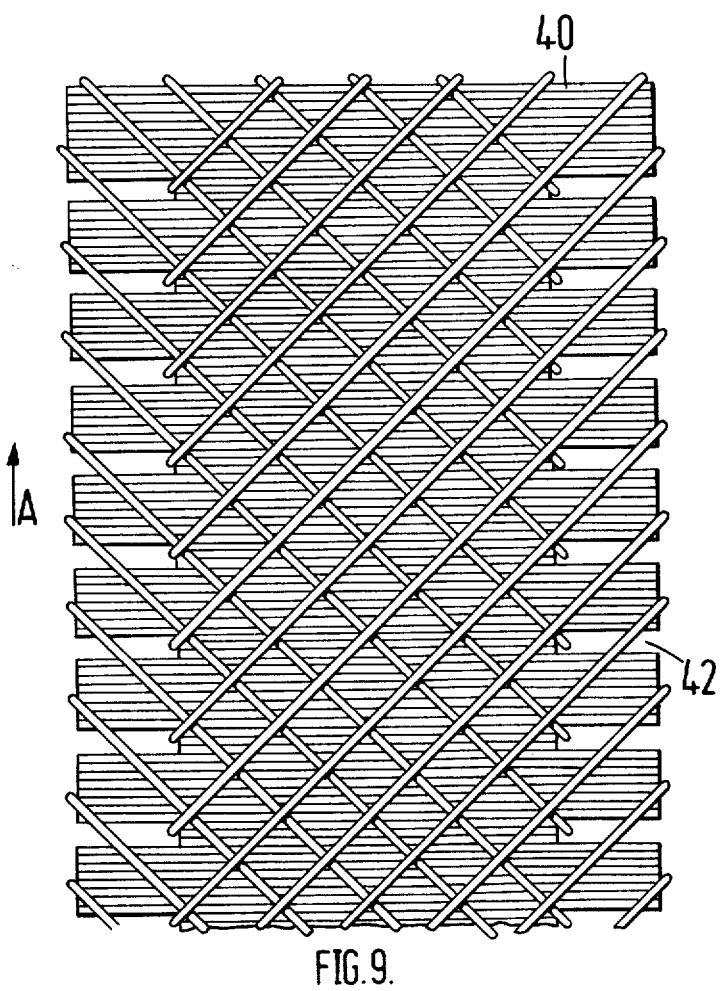
FIG. 9 is a plan view of the working face of the primary of a modified version of the motor illustrated in FIG. 1.

FIG. 9 illustrates a modification of the primary shown in FIG. 1 in which the waffle configuration does not extend over the whole of the working face of the primary core 40. To permit this, the core 40 has a series of lateral slots such as the slot 42 in each side face. The motor is gramme-ring wound, each winding, apart from those near the ends of the motor, extending from one of the lateral slots to the side face on the other side of the motor. Thus, the windings have waffle configuration in the central region bounded by the inner ends of the two sets of lateral slots. The remainder of the working face of the primary are covered by windings inclined to the direction of motion in one direction only. Thus, these areas produce travelling fields having a lateral component. The resulting lateral forces produced at one side of the primary exactly balance those produced by the other provided that these side portions confront secondary material of identical widths and thickness. Thus, if the secondary is made either the same width as or slightly narrower than the primary and the directions of the travelling fields are arranged to be such that each side portion produces an outwardly directed force on the primary member, then the primary will tend to remain in alignment with the secondary since, if it moves to one side, the secondary will confront a smaller part of the side portion of the motor in the direction in which the primary has been displaced, thereby reducing the lateral force on the primary member in that direction. The whole of the side portion of the motor on the other side will still confront the secondary and consequently the lateral force in the other direction will be undiminished and a centralising force will be produced. Thus by modifying it as shown in FIG. 9, the primary of FIG. 1 can be given a centralising capability. As with the embodiment shown in FIG. 1, slots may be cut in the surface of the working face of the primary to accommodate the winding conductors and allow the air gap between the primary and the secondary to be reduced.

Figure 10:
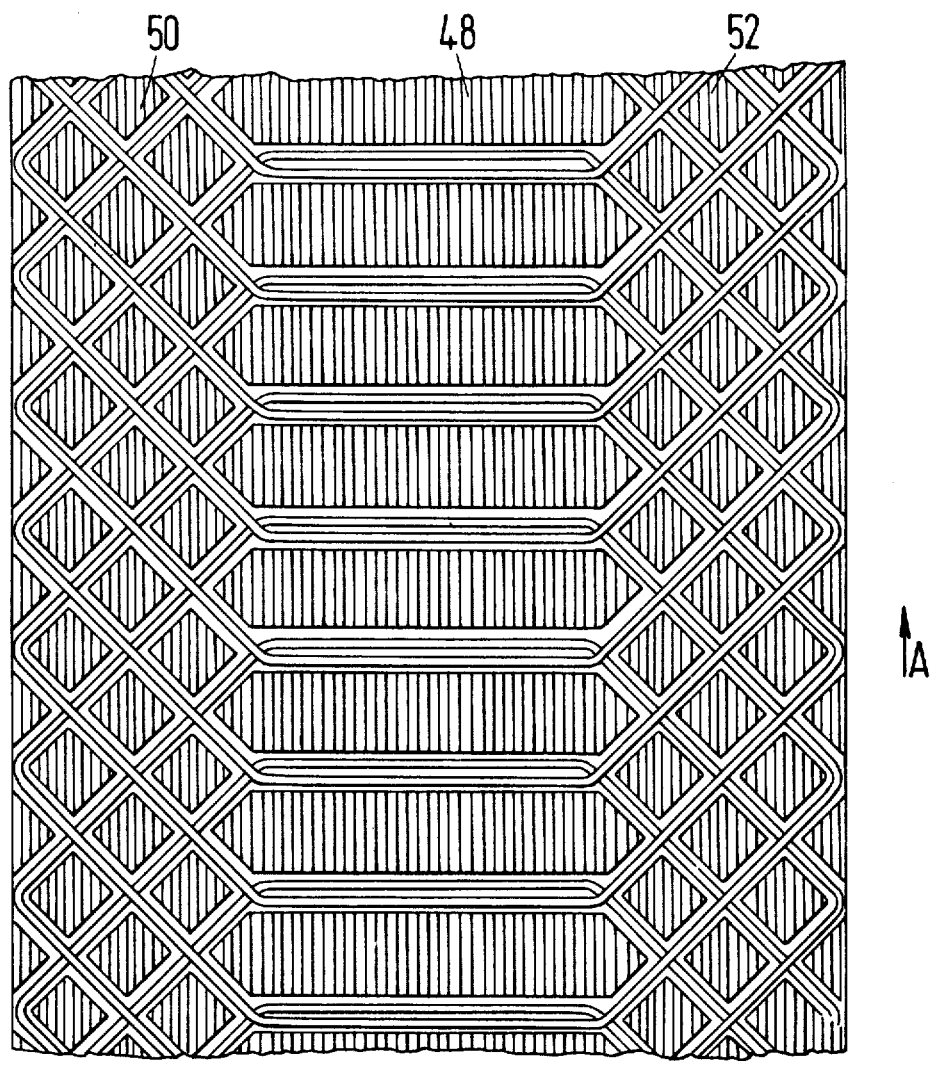
FIG. 10 is a plan view of the working face of the primary of a longitudinal flux motor having a central region of straight windings and end windings in the form of waffle windings.

FIG. 10 illustrates part of the working face of the primary of what is basically a conventional surface-wound longitudinal flux motor. The central region of the primary core is provided with a series of teeth such as the tooth 48 having slots therebetween. However, instead of leaving the end windings outside the core, they are formed with waffle configuration and accommodated in correspondingly shaped slots in the side portions 50 and 52 of the core. Thus, the end windings are coupled to the secondary and end winding leakage is substantially avoided.

The waffle configuration may be used to reduce end winding leakage in other types of linear induction motor. For example, a toothless version, in which the winding conductors are accommodated in the air gap between the primary and the secondary can be produced. As a further variant, teeth may be provided for the central part of the winding conductors but not for the waffle configuration on each side.

Figure 11:
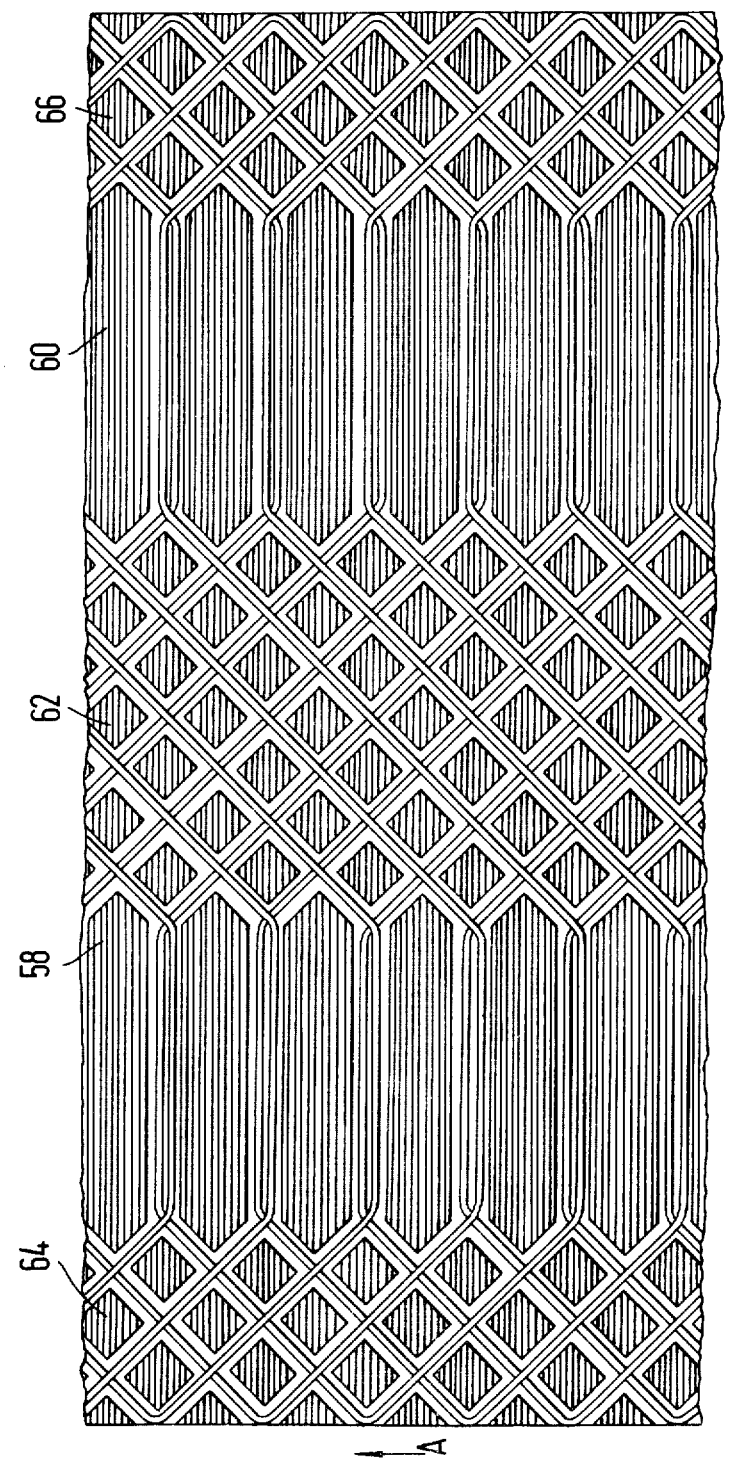
FIG. 11 is a plan view of the working face of the primary of a transverse flux version of the motor illustrated in FIG. 10.

The waffle configuration can also be used for the end windings of transverse flux motors. FIG. 11 is a schematic plan view of the working face of the primary of a C core transverse flux motor. The core comprises two rows of transverse teeth 58 and 60, which form the basic C core structure, separated by an array 62 of teeth of waffle configuration. Additional arrays 64 and 66 of teeth of waffle configuration are disposed on the outside of the rows 58 and 60 respectively. The central array of waffle configuration teeth 62 enables flux to link with the confronting central part of the secondary and the side arrays of waffle configuration teeth 64 and 66 substantially reduce end winding leakage.

The invention also provides several variants of the embodiment shown in FIG. 11. For example, in a toothless version (not illustrated), the windings are disposed on the surface of a primary having a flat working face. Alternatively, the arrays of transverse teeth 58 and 60 may be present without the teeth for the areas of waffle configuration. Alternatively, the outer waffle configuration windings may be replaced by conventional end windings and windings of waffle configuration, either with or without teeth, provided only between the two arrays of lateral teeth. The method of construction described with reference to FIGS. 3 and 5 can be applied to any of the embodiments shown in FIGS. 7, 9, 10 or 11.

Figure 12:
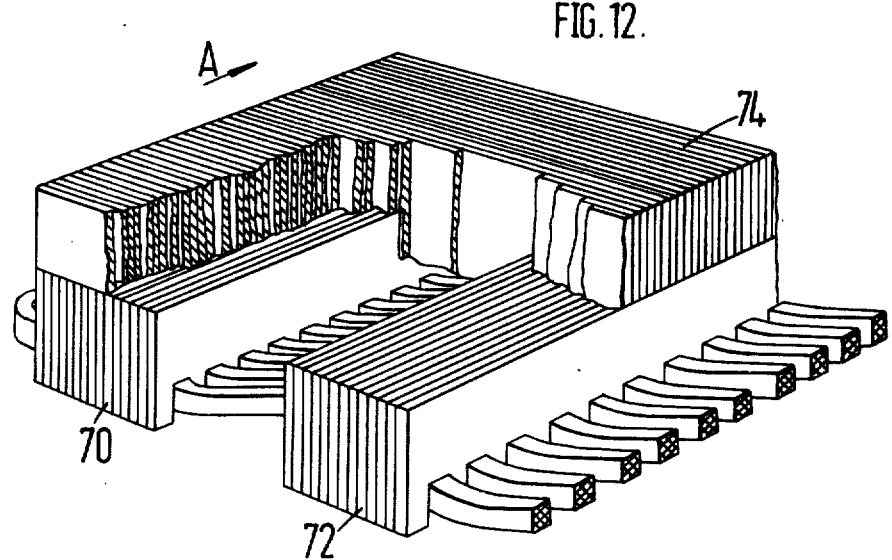
FIG. 12 is a partially broken away perspective view of a modified form of the motor illustrated in FIG. 11.
Figure 13:
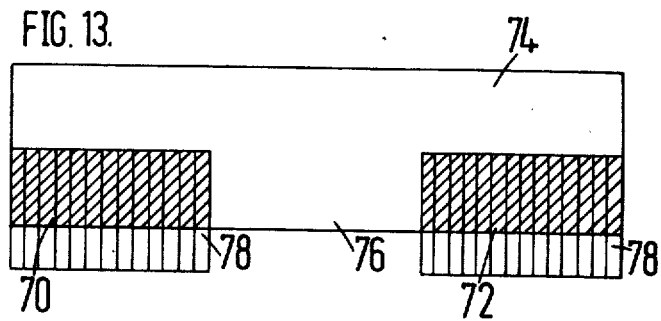
FIG. 13 is a transverse sectional view of the core of the motor illustrated in FIG. 12.

The invention can also be applied to hybrid motors, that is motors which are basically transverse flux motors but which have a percentage of longitudinal flux such as are described in our co-pending U.S. Pat. No. 3,770,995. A motor of this type in which there is a relatively small amount of coupling from a waffle configuration winding between parallel arrays of lateral teeth is illustrated in FIG. 1 of co-pending U.S. Pat. No. 3,746,899. However, a preferred arrangement is illustrated in FIGS. 12 and 13 of the present application where the primary core is formed from two sets of longitudinal laminations 70 and 72 which are provided with transverse teeth and which are magnetically inter-connected by a set of transverse laminations 74. As can best be seen from FIG. 12, the laminations 74 are substantially T-shaped. The stem portion 76 of the T-shape, which extends between the stacks 70 and 72 of longitudinal laminations, extends down as far as the tops 78 in the slots of these laminations.

Figure 14:
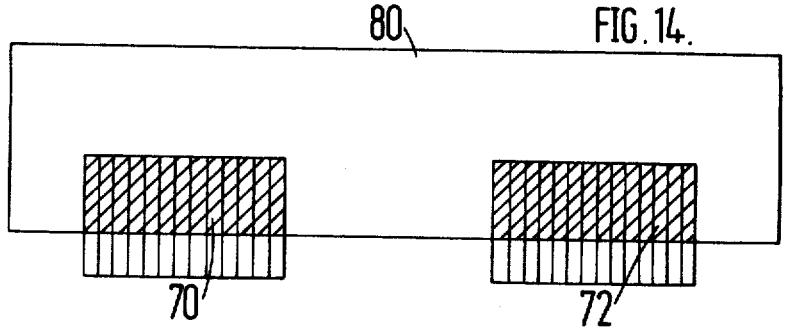
FIG. 14 is a transverse sectional view of a modified form of core suitable for use with the motor illustrated in FIG. 12.

FIG. 14 illustrates an alternative embodiment where the transverse laminations 74 of the embodiment illustrated in FIGS. 12 and 13 are replaced by E-shaped laminations 80 which extend laterally beyond the outer edges of the stacks 70 and 72 of longitudinal laminations to provide coupling for waffle configuration end windings (not shown) similar to those illustrated in FIG. 10.

In non-illustrated modifications of the embodiments illustrated in FIGS. 12 and 13 and in FIG. 14, teeth are provided on the stack of transverse laminations to accommodate the waffle configuration windings.

The invention also provides a series of embodiments similar to those illustrated in FIG. 11 to 14 and to the non-illustrated modifications of those embodiments, where the motor is basically a transverse flux E core machine.

Figure 15:
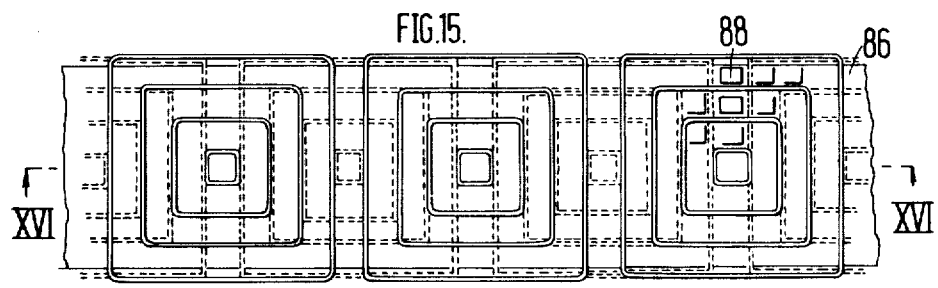
FIG. 15 is a plan view of part of the working face of the primary of a longitudinal flux linear induction motor in accordance with another embodiment of the invention.
Figure 16:
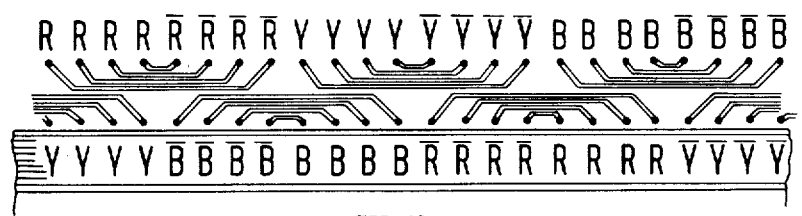
FIG. 16 is a schematic section taken on the line XVI - XVI in FIG. 15.

Several embodiments of the invention will now be described in which the winding conductors extend parallel and perpendicular to the direction of movement of the motor. FIGS. 15 and 16 illustrate the primary of a longitudinal flux motor having two layers of concentric windings. The core 86 comprises longitudinal laminations and has a regular array of rectangular teeth, such as the tooth 88 separated by longitudinal and transverse slots covering the entire working face of the primary core. As can be seen, each transverse row of teeth across the width of the motor comprises seven teeth. The windings are formed in two layers, each layer consisting of a series of phase groups of four concentric windings. The inner winding of each phase group surrounds a single tooth, the second winding surrounds nine teeth, the third coil surrounds 25 teeth and the fourth coil, which extends across the full width of the motor, surrounds forty-nine teeth. The next phase group in the same layer is centred on the tooth in the centre longitudinal row eight teeth away from that on which the previous group was centred. Thus there is one lateral row of teeth which is not surrounded by a winding or either phase group. A phase group of the other layer is centred on the tooth of this row. With this arrangement, not more than one winding of each layer is disposed in any one slot. As shown in FIG. 15, the energising current in one layer at any position along the length of the motor is 120° out of phase with that in the other layer.

Figure 17:
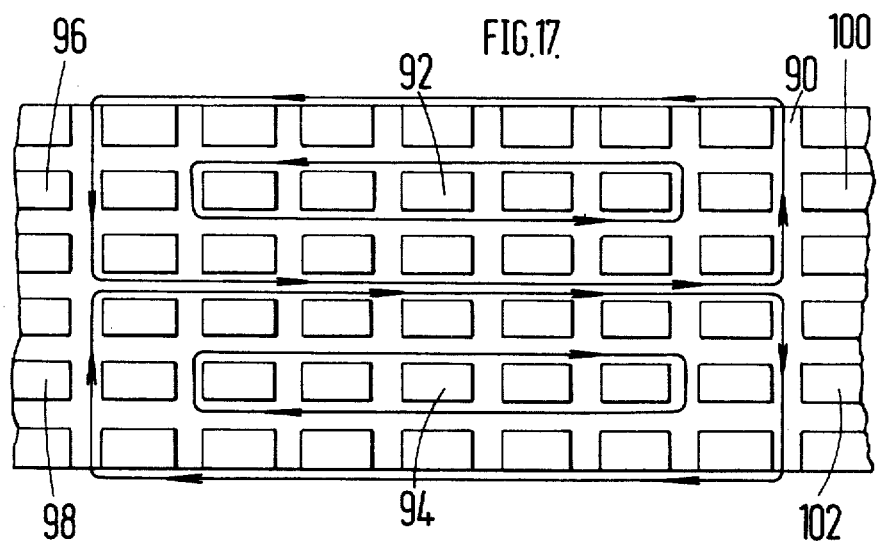
FIG. 17 is a plan view of a motor similar to that shown in FIG. 15 but having a "C" core arranged for transverse flux.

Transverse flux versions of the motor illustrated in FIGS. 15 and 16 can be produced. FIG. 17 illustrates a C core transverse flux primary. The laminations on the core 90 are perpendicular to the desired direction of travel. Only one coil group of one layer of the windings is shown. It will be seen that this consists of two sets of concentric windings centred on the teeth 92 and 94 respectively and each forming one phase pole. It will be appreciated that the windings of the other layer which are to be superimposed on the windings shown will be centred on the teeth 96, 98, 100 and 102.

Figure 18:
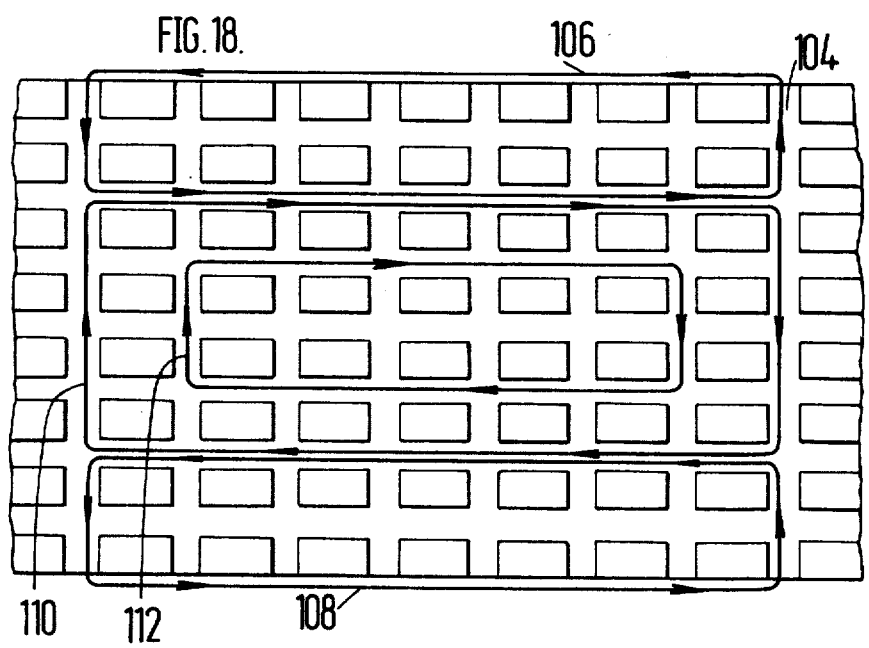
FIG. 18 is a plan view of the working face of the primary of an "E" core version of the motor shown in FIG. 17.

FIG. 18 illustrates an E core version of the machine shown in FIG. 17. Again the laminations in the core 104 are transverse. For each phase, the outer poles of the E core are defined by single windings 106 and 108 respectively while the centre pole comprises a set of two concentric windings 110 and 112. It will be seen that the motor shown in FIG. 18 differs from those shown in FIGS. 15 to 17 in that the centre winding of each set of concentric windings embraces two sets of teeth in the transverse direction instead of one. The invention permits the centre winding of a set of concentric windings to embrace any number of teeth in either the longitudinal or the transverse direction although it will then usually be preferable to construct the core with a non-uniform array of teeth, omitting those slots.

Figure 19:
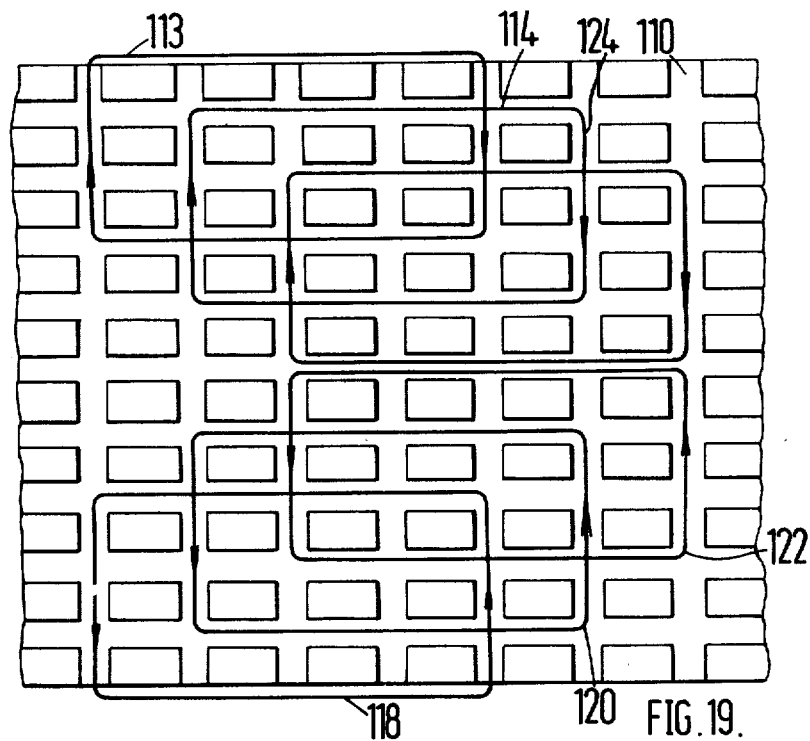
FIG. 19 is a plan view of the working face of the primary of a modified form of the motor shown in FIG. 17.

FIG. 19 illustrates a modification of the transverse flux C core primary shown in FIG. 16. The windings of each phase group are skewed with respect to the corresponding group on the opposite side of the centre line of the motor so as to produce inwardly travelling fields at any transverse plane of the motor. As already described with reference to FIG. 9, such inwardly travelling fields can be used to produce laterally stabilising forces. The primary 110 is, of course, formed from transverse laminations and three windings 113, 114 and 116 form one phase group while three similar windings 118, 120 and 122 form the other. It will be seen that at points such as 124, the windings of the same layer cross one another and consequently the slot must be deep enough to accommodate at least three layers of windings at this point.

Figure 20:
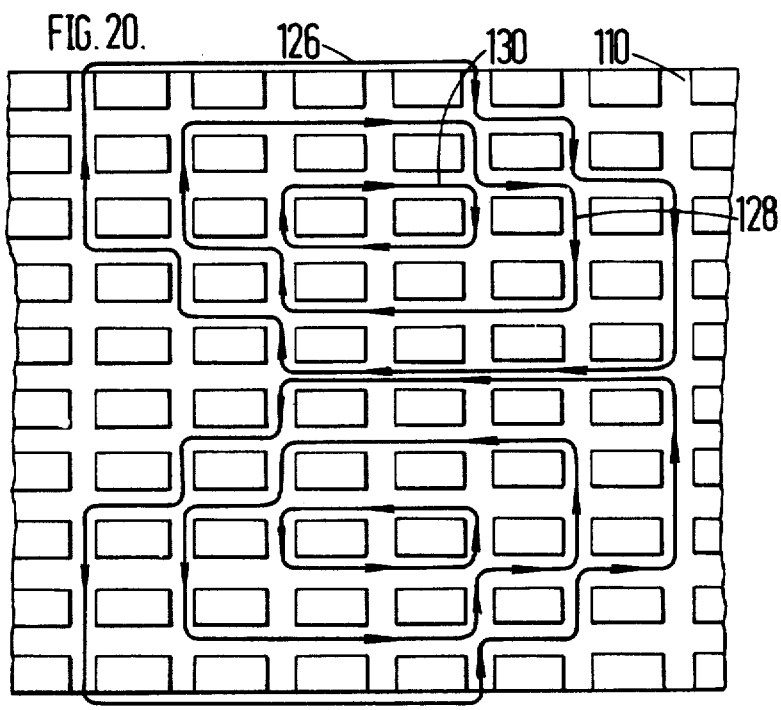
FIG. 20 is a plan view, similar to FIG. 19, illustrating a modified winding arrangement.

FIG. 20 illustrates a modification of the motor shown in FIG. 19 to avoid intersections of windings of the same layer. The core 110 is unchanged but each phase group is defined by a set of three concentric windings such as the windings 126, 128 and 130.

In non-illustrated embodiments of the invention, the motors illustrated in FIGS. 15 to 20 are modified by omitting the teeth from the working face of the core and locating the windings in the air gap between the primary and the secondary.

Figure 21:
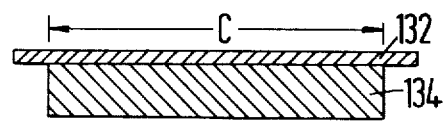
FIG. 21 is a transverse sectional view of a secondary suitable for use with any of the primaries described with reference to FIGS. 1 to 20.

FIG. 21 is a transverse cross-sectional view of a secondary suitable for use with any of the primaries described above. The secondary comprises a reaction plate 132 consisting of a sheet of electrically conductive material such as aluminium and a secondary core 134 consisting of a rectangular stack of laminations of magnetic material. The width of the primary cores is indicated by the reference character C, and as shown is coextensive in width with the secondary core 134. The laminations are arranged transversely for motors with transverse flux in the secondary and longitudinally for motors with longitudinal flux in the secondary.

In embodiments of the invention where the windings are not disposed in slots in the working face of the primary, the windings are disposed closely adjacent to such face. Double-sided linear induction motors may be constructed employing primaries in accordance with any of the embodiments of the invention.

The invention may also be applied to single-phase linear induction motors, but in this case it is necessary to provide separate starting arrangements.

Linear induction motors in accordance with the invention are particularly applicable to high-speed transport systems such as those employing tracked ground-effect vehicles.

We claim:

1. A linear induction motor comprising a primary having a core of magnetic material and plural phase winding conductors traversing the working face of said core, and a secondary having a reaction plate of electrically conductive material and a core of magnetic material substantially coextensive in width with said primary core, characterized in that the winding conductors of said primary on at least part of the working face of said primary core are arranged in two superimposed groups inclined in opposite directions to the longitudinal axis of the motor, said two groups of winding conductors being disposed in close proximity to the magnetic core of said primary so as to be magnetically coupled thereto.

2. A linear induction motor as claimed in claim 1, in which said two groups of winding conductors are inclined at equal and opposite angles to the longitudinal axis of the motor.

3. A linear induction motor as claimed in claim 1, in which said two groups of winding conductors are disposed in slots in the working face of the primary core.

4. A linear induction motor as claimed in claim 1, in which said two superimposed groups of winding conductors extend across the entire working face of the primary core.

5. A linear induction motor as claimed in claim 4, in which the primary core is constructed to allow passage of flux in directions perpendicular to the longitudinal axis of the motor.

6. A linear induction motor as claimed in claim 5, in which each winding forms two complete pole pitches across the width of the motor.

7. A linear induction motor as claimed in claim 5, in which return conductors are disposed on the opposite side of the primary core to the working face thereof and arranged parallel to the corresponding conductors on the working face.

8. A linear induction motor as claimed in claim 4, in which adjacent ends of the winding conductors of the two groups are interconnected whereby the winding conductors of one group form return conductors for the other group.

9. A linear induction motor as claimed in claim 4, in which the primary core is constructed to allow passage of flux in directions parallel to the longitudinal axis of the motor.

10. A linear induction motor as claimed in claim 1, in which a first of said groups superimposed windings extends beyond the second of said groups on one side of the primary core and the second of said groups of superimposed windings extends beyond the first of said groups on the other side of the core.

11. A linear induction motor as claimed in claim 1, in which a part of the working face of the primary core which is traversed by said two superimposed groups of winding conductors is bounded on one side by a region in which winding conductors extend perpendicular to the longitudinal axis of the motor, said perpendicular winding conductors being connected to respective inclined winding conductors at the boundary of said region.

12. A linear induction motor as claimed in claim 11, in which the primary core is arranged to permit flow of flux in directions parallel with the longitudinal axis of the motor and a region in which winding conductors extend perpendicular to the longitudinal axis of the motor is bounded on both sides by regions having two groups of superimposed windings inclined in opposite directions to the longitudinal axis of the motor.

13. A linear induction motor as claimed in claim 11, in which the magnetic primary core is arranged to permit flow of flux in directions perpendicular to the longitudinal axis of the motor and said two superimposed groups are bounded on both sides by regions in which winding conductors extend perpendicular to the longitudinal axis of the motor.

14. A linear induction motor as claimed in claim 13, in which said two regions in which winding conductors extend perpendicular to the longitudinal axis of the motor are bounded on the sides thereof remote from said two superimposed groups by further regions of the working face each traversed by further pairs of superimposed groups of winding conductors inclined in opposite directions to the longitudinal axis of the motor, the winding conductors of said further pairs of groups being disposed in close proximity to the magnetic core of the primary so as to be magnetically coupled thereto.

15. A linear induction motor as claimed in claim 13, in which the magnetic of the primary core is also arranged to permit flow of flux in directions parallel to the longitudinal axis of the motor.

* * * * *